US010068683B1

(12) United States Patent
Watkins, II

(10) Patent No.: US 10,068,683 B1
(45) Date of Patent: Sep. 4, 2018

(54) RARE EARTH MATERIALS AS COATING COMPOSITIONS FOR CONDUCTORS

(71) Applicant: Southwire Company, LLC, Carrollton, GA (US)

(72) Inventor: Bobby G. Watkins, II, Columbia, SC (US)

(73) Assignee: Southwire Company, LLC, Carrollton, GA (US)

( * ) Notice: Subject to any disclaimer, the term of this patent is extended or adjusted under 35 U.S.C. 154(b) by 11 days.

(21) Appl. No.: 14/731,454

(22) Filed: Jun. 5, 2015

Related U.S. Application Data

(60) Provisional application No. 62/008,872, filed on Jun. 6, 2014.

(51) Int. Cl.
*H01B 7/28* (2006.01)
*C23C 24/04* (2006.01)
*H01B 1/02* (2006.01)
*H01B 3/10* (2006.01)

(52) U.S. Cl.
CPC .............. *H01B 7/28* (2013.01); *C23C 24/04* (2013.01); *H01B 1/023* (2013.01); *H01B 3/105* (2013.01)

(58) Field of Classification Search
CPC .... H01B 7/28; H01B 1/02; H01B 3/10; C23C 24/04
USPC ....................................... 174/113 R; 427/123
See application file for complete search history.

(56) References Cited

U.S. PATENT DOCUMENTS

| 4,223,179 | A | * | 9/1980 | Lusk ........................ H01R 4/30 |
| | | | | 174/73.1 |
| 7,231,239 | B2 | | 6/2007 | Schmidt |
| 7,622,425 | B2 | | 11/2009 | Allais et al. |
| 7,737,086 | B2 | | 6/2010 | Allais et al. |
| 7,887,934 | B2 | | 2/2011 | Gentleman et al. |
| 7,892,660 | B2 | | 2/2011 | Gentleman et al. |
| 7,897,271 | B2 | | 3/2011 | Gentleman et al. |
| 7,901,798 | B2 | | 3/2011 | Gentleman et al. |
| 7,977,267 | B2 | | 7/2011 | Gentleman et al. |
| 8,008,233 | B2 | | 8/2011 | Isfort et al. |
| 8,057,922 | B2 | | 11/2011 | Gentleman et al. |
| 8,057,923 | B2 | | 11/2011 | Gentleman et al. |
| 8,062,775 | B2 | | 11/2011 | Gentleman et al. |
| 8,112,135 | B2 | | 2/2012 | Allals et al. |
| 8,173,279 | B2 | | 5/2012 | Gentleman et al. |
| 8,178,219 | B2 | | 5/2012 | Gentleman et al. |

(Continued)

FOREIGN PATENT DOCUMENTS

CN 102847668 A 1/2013
CN 202677862 U * 1/2013
(Continued)

*Primary Examiner* — Timothy Thompson
*Assistant Examiner* — Charles Pizzuto
(74) *Attorney, Agent, or Firm* — Edell, Shapiro & Finnan, LLC

(57) ABSTRACT

A conductor includes a core with at least one conductive filament, and a coating deposited on a surface of the core. The coating is made of a rare earth material that includes at least one rare earth element selected from the group consisting of Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), Scandium (Sc) and Yttrium (Yt).

12 Claims, 3 Drawing Sheets

(56) References Cited

U.S. PATENT DOCUMENTS

| | | |
|---|---|---|
| 8,222,172 B2 | 7/2012 | Gentleman et al. |
| 8,236,432 B2 | 8/2012 | Gentleman et al. |
| 8,497,029 B2 | 7/2013 | Gentleman et al. |
| 8,673,821 B2 | 3/2014 | Book et al. |
| 8,798,696 B2 | 8/2014 | Steinmeyer et al. |
| 8,822,827 B2 | 9/2014 | Amils |
| 8,948,831 B2 | 2/2015 | Stemmle et al. |
| 2001/0024728 A1 | 9/2001 | Kamitani et al. |
| 2004/0043230 A1 | 3/2004 | Hatono et al. |
| 2004/0104377 A1* | 6/2004 | Phelps .................. C09C 1/62 252/387 |
| 2004/0206267 A1 | 10/2004 | Sambasivan et al. |
| 2007/0098975 A1 | 5/2007 | Gill |
| 2007/0141246 A1 | 6/2007 | Le Craz |
| 2008/0124467 A1 | 5/2008 | Chapel et al. |
| 2008/0299046 A1 | 12/2008 | White et al. |
| 2009/0011930 A1 | 1/2009 | Hagemeyer |
| 2009/0155609 A1 | 6/2009 | Gentleman et al. |
| 2009/0241496 A1 | 10/2009 | Pintault et al. |
| 2009/0324834 A1 | 12/2009 | Hanson |
| 2010/0211158 A1 | 8/2010 | Haverty et al. |
| 2012/0095196 A1 | 4/2012 | Fujita et al. |
| 2013/0032529 A1* | 2/2013 | Hassler ............ B01D 39/2062 210/497.01 |
| 2013/0045645 A1* | 2/2013 | De France ............ H01R 4/20 439/879 |
| 2013/0251942 A1* | 9/2013 | Azimi .................. C04B 35/50 428/141 |
| 2013/0251946 A1 | 9/2013 | Azimi et al. |
| 2014/0041925 A1 | 2/2014 | Davis et al. |
| 2014/0147654 A1 | 5/2014 | Walther et al. |
| 2014/0302997 A1 | 10/2014 | Takayasu |
| 2014/0349137 A1 | 11/2014 | Brandl et al. |
| 2014/0356578 A1 | 12/2014 | Brandl et al. |
| 2015/0152558 A1 | 6/2015 | Walther et al. |
| 2015/0235739 A1* | 8/2015 | Davis .................. H01B 9/006 174/40 R |

FOREIGN PATENT DOCUMENTS

| | | | | |
|---|---|---|---|---|
| DE | 102011080639 A1 | 10/2012 | | |
| FR | 2928642 A1 | 9/2009 | | |
| GB | 2487052 A * | 7/2012 | ............... | H01B 1/04 |
| JP | S6467813 A | 8/1987 | | |
| JP | S63223701 A | 9/1988 | | |
| WO | 03048403 A1 | 6/2003 | | |
| WO | 2007110185 A1 | 10/2007 | | |
| WO | 2012163946 A1 | 12/2012 | | |
| WO | 2012163947 A1 | 12/2012 | | |
| WO | 2013091606 A2 | 6/2013 | | |
| WO | 2013091607 A2 | 6/2013 | | |
| WO | 2013141877 A1 | 9/2013 | | |
| WO | 2013142988 A1 | 10/2013 | | |
| WO | 2014025420 A1 | 2/2014 | | |

\* cited by examiner

RARE EARTH MATERIALS AS COATING COMPOSITIONS FOR CONDUCTORS

CROSS-REFERENCE TO RELATED APPLICATION

This application claims priority to U.S. Provisional Patent Application No. 62/008,872, filed Jun. 6, 2014, entitled "Rare Earth Materials as Coating Compositions for Conductors," the entire disclosure of which is incorporated by reference herein.

FIELD

The present invention relates to coatings for conductors, such as conductors for overhead power transmission lines.

BACKGROUND

Overhead power transmission lines provide electrical power transmission and distribution over great distances. The power transmission lines are typically supported via towers and/or poles so as to be suspended at a safe distance from the ground so as to prevent dangerous contact with an energized line during power transmission operations.

It is desirable to provide an adequate coating for conductors that is resistant to accumulation of ice as well as resistant to wear from the outside environment while providing adequate insulating properties to the conductor.

SUMMARY

A conductor comprises an elongate central or core member comprising one or more conductive filaments and a coating composition surrounding at least a portion of the central member, where the coating composition comprises a rare earth material. The rare earth material includes at least one rare earth element selected from the group consisting of Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), Scandium (Sc) and Yttrium (Yt).

In an example embodiment, the conductor comprises an overhead conductor including a plurality of filaments bundled in any suitable manner within the core member.

In another example embodiment, the conductor is coated with the coating composition utilizing a cold spray deposition process.

These and/or other features, aspects, and advantages of the present invention will become better understood when the following detailed description is read with reference to the accompanying drawings in which like characters represent like parts throughout the drawings.

DETAILED DESCRIPTION

Figure 1:
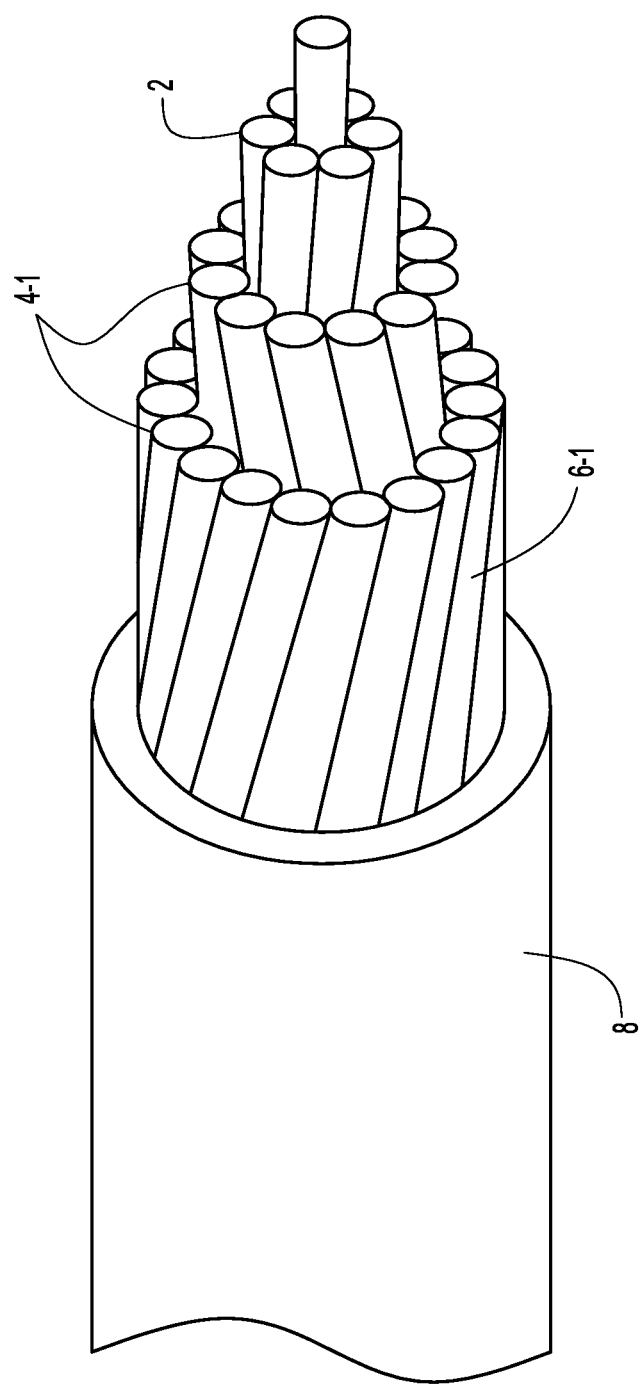
FIG. 1 depicts a side view in partial cross section depicting an aluminum conductor steel supported (ACSS) round wire (RW) conductor cable to which a coating as described herein is applied.
Figure 2:
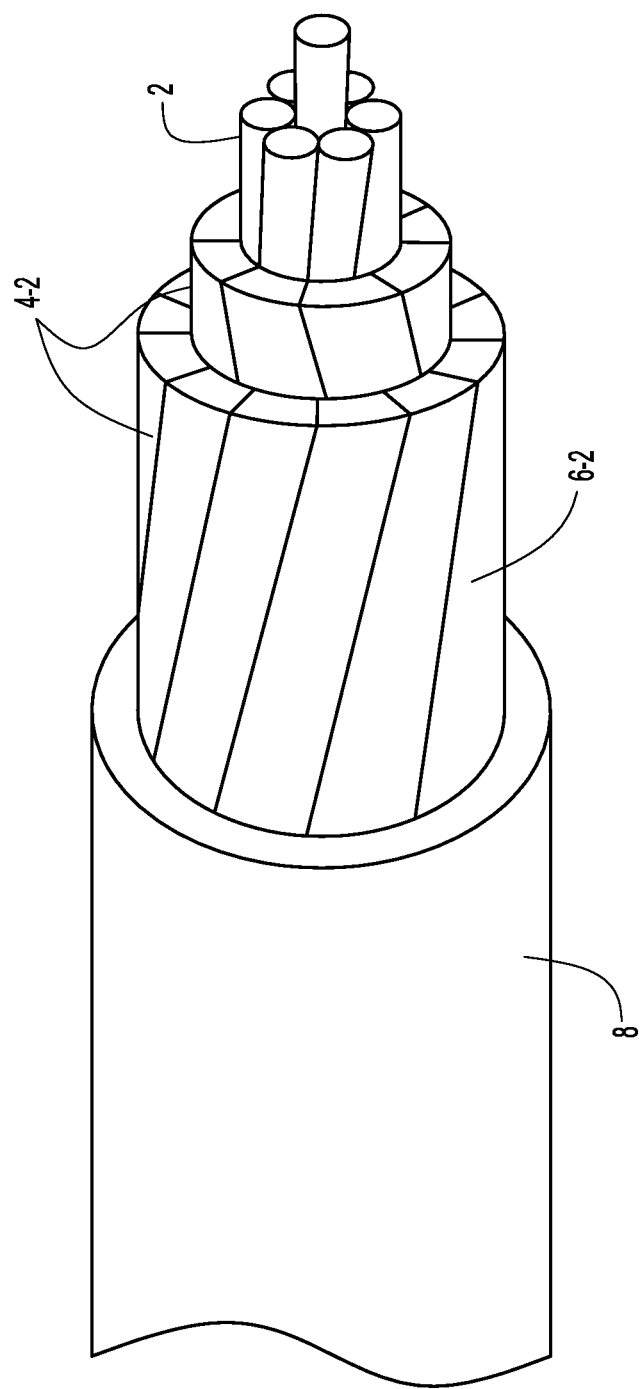
FIG. 2 depicts a side view in partial cross section depicting an aluminum conductor steel supported (ACSS) trap wire (TW) conductor cable to which a coating as described herein is applied.

Conductors are described herein that include coating compositions comprising a rare earth material, where the rare earth material includes at least one rare earth element. In addition to insulating properties for the conductor, the rare earth material in the coating composition provides sufficient hydrophobic properties as well as sufficient anti-icing properties to inhibit or prevent a build-up of ice on the conductor during exposure to the elements in outdoor environments.

The rare earth material can include any one or a combination of rare earth elements selected from the group consisting of Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), Scandium (Sc) and Yttrium (Yt). In example embodiments, the rare earth material can include La, Ce, Gd, Er, Tm and combinations thereof.

The rare earth material can include one or more rare earth elements in their elemental form. Alternatively, the rare earth material can include one or more rare earth oxides. Further still, the rare earth material can include combinations of one or more rare earth elements in their elemental form combined with one or more rare earth oxides. Some non-limiting examples of rare earth oxides for use in the rare earth material include $La_2O_3$, $CeO_2$, $Gd_2O_3$, $Er_2O_3$, and $Tm_2O_3$.

Optionally, the rare earth material can also include additional components other than rare earth elements or rare earth oxides. For example, one or more additives can be provided to the rare earth material to enable or enhance cohesion of particles within the coating as well as adhesion and/or stability of the rare earth material to the conductor surface. Some non-limiting examples for additional components include aluminum (Al) and zinc (Zn). In particular, certain rare earth element particles or rare earth oxide particles may not adhere well to each other such that, upon deposition on a conductor surface, the resultant coating may exhibit some amount of flaking or loss of particles from the coating. An additive such as Al or Zn, provided in a suitable amount within the rare earth material, will function as an adhesive between rare earth element particles and/or rare earth oxide particles that enhances cohesion and stability of the coating. The rare earth material can also include any other suitable additives as desired for a particular application. Alternatively, the rare earth material can be substantially free of any additive. For example, the rare earth material can comprise substantially entirely one or more rare earth elements and/or one or more rare earth oxides such that the rare earth material contains less than 5% by volume (e.g., no more than 1% by volume, or no more than 0.5% by volume) of any other component.

The conductor can be coated with the rare earth material in any suitable manner that facilitates an acceptable adhesion of the rare earth material to the conductor surface. Some examples for coating a rare earth material to the surface of a conductor include wet or thermal spray techniques (e.g., sputtering, plasma spraying, arc spraying, chemical vapor deposition, etc.) and dry techniques (e.g., cold spray deposition).

A conductor to be coated with the rare earth material is typically elongated and has a non-planar surface area, such as a rounded or multi-faceted outer peripheral surface area (e.g., the cross-section of the conductor may be circular or multi-faceted, such as square, hexagonal or octagonal) extending around the circumference or exterior of the conductor. The rare earth material is coated around at least a portion of the rounded or multi-faceted peripheral surface area, preferably the entire periphery and over a suitable length of the conductor. The conductor can have any suitable length. For example, the conductor can have a substantially continuous length in environments in which the conductor is configured to extend great distances (e.g., an overhead power transmission conductor configured to extend for miles or kilometers).

In example embodiments, a cold spray deposition process is utilized to coat the surface of a conductor with the rare earth material. In a cold spray deposition process, a material coating is applied by impacting a solid powder of material at a high velocity against a substrate surface that causes particles within the solid powder to plastically deform and adhere to the substrate surface. Solid powders having particle sizes in the range, e.g., of about 1 micrometer to about 50 micrometers in cross-section are contacted with a carrier gas and accelerated in supersonic gas jets through a nozzle toward the substrate surface at high velocities (e.g., velocities from about 500 meters per second to about 1000 meters per second). The carrier gas can be, e.g., nitrogen or helium. To achieve a uniform thickness along the substrate surface, one or both of the spraying nozzle and substrate is moved in relation to the other. In addition, multiple spraying nozzles can also be utilized to coat the surface. The carrier gas can be heated to a temperature that is less than the melting point of the solid powder material, such that deposition occurs with the powder remaining in a solid state. The kinetic energy of the particles, supplied by the expansion of the gas emerging from the nozzle, is converted to plastic deformation energy during bonding.

As previously noted, an additive such as Al or Zn can be combined with the REE and/or REO to promote or ensure cohesion of the rare earth element (REE) and/or rare earth oxide (REO) particles together as well as enhancing adhesion on the conductor surface. A volumetric ratio of REE and/or REO to additive in the rare earth material can be in the range of about 95:5 to about 5:95 (e.g., from about 95:5 to about 55:45). In example embodiments, the majority of the volume of the rare earth material consists of the REE and/or REO (i.e., the additive is provided within the rare earth material in an amount that is less than 50% by volume of the rare earth material). Example volumetric ratios of REE and/or REO to additive within the rare earth material include, without limitation, 80:20, 75:25, 70:30, 65:35 and 60:40.

The additive can be combined with the REE and/or REO within the rare earth material in any suitable manner. In an example embodiment, REE and/or REO particles are coated with the additive (e.g., coated with Al or Zn). The coated particles are then cold spray deposited onto the conductor surface. For example, the coated particles can be provided from a particle feeder into a spray chamber that includes an exhaust or nozzle outlet directed toward the surface of the conductor. The particles are sufficiently coated so as to achieve the desired volumetric ratio of REE and/or REO to additive. The carrier gas is injected into the chamber from a gas supply source at a high pressure (e.g., at a pressure of at least about 1.0 MPa, such as at least about 1.5 MPa) and a suitable flow rate (e.g., at least about 1 m³/min, such as a flow rate of at least about 2 m³/min) so as to eject the coated particles at high velocity (e.g., from about 400 m/s to about 1200 m/s) from the nozzle outlet toward the conductor surface. The spray chamber with nozzle can be moved along the conductor surface to coat the surface with the rare earth material, where movement can include a single pass or a plurality of passes along the entire length of the conductor. The conductor can also be rotated so as to facilitate even coating along the outer perimeter of the conductor as the nozzle travels along the length of the conductor.

In another example embodiment, REE and/or REO particles and additive particles are provided from separate particle feeders into the spray chamber, where each type of particle is provided at a suitable flow rate within the spray chamber during the cold spray deposition to achieve the desired volumetric ratio of REE and/or REO to additive within the resultant rare earth material emerging from the spray nozzle.

In further example embodiments, any suitable number of particle feeders can be provided to inject two or more REE particles and/or REO particles within the spray chamber, where the particles are either coated with additive or the additive is also injected via a further particle feeder within the spray chamber, with the flow rates from the particle feeders being adjusted accordingly to ensure the desired ratio of REE particles and/or REO particles in relation to each other as well as additive within the resultant rare earth material emerging from the spray nozzle.

The particle sizes for the REE and REO powders, as well as the additive powders (for embodiments in which the additive does not coat the REE and REO particles but instead is combined with REE and/or REO particles) can be any suitable dimensions depending upon a particular type of coating application process utilized. For example, for certain coating application techniques such as cold spray deposition, the particle sizes for REE and REO powders can be in the range from about 1 micrometer to about 50 micrometers, for example from about 10 micrometers to about 50 micrometers, or from about 20 micrometers to about 50 micrometers. However, other particle sizes can also be utilized for other types of coating application processes, including particle sizes less than about 1 micrometer and also particle sizes greater than 50 micrometers (e.g., 100 micrometers or greater). The particle sizes can also vary depending upon a particular type of REE and/or REO powder utilized, such that one type of REE or REO has a first particle size range while another type of REE or REO has a second particle size range. Additives such as Al or Zn can also have particle size ranges similar or different from the REE and/or REO particles of the coating powder, where the size ranges of the additives can also be in the same ranges as noted herein for the REE and REO powders.

The coating comprising the rare earth material formed on the conductor can have any thickness that is suitable for a particular application. In an example embodiment, a coating thickness will be at least about 20 mil (thousands of an inch) (about 0.508 millimeter) and also will be no greater than about 300 mil (about 7.62 millimeters).

Figure 3:
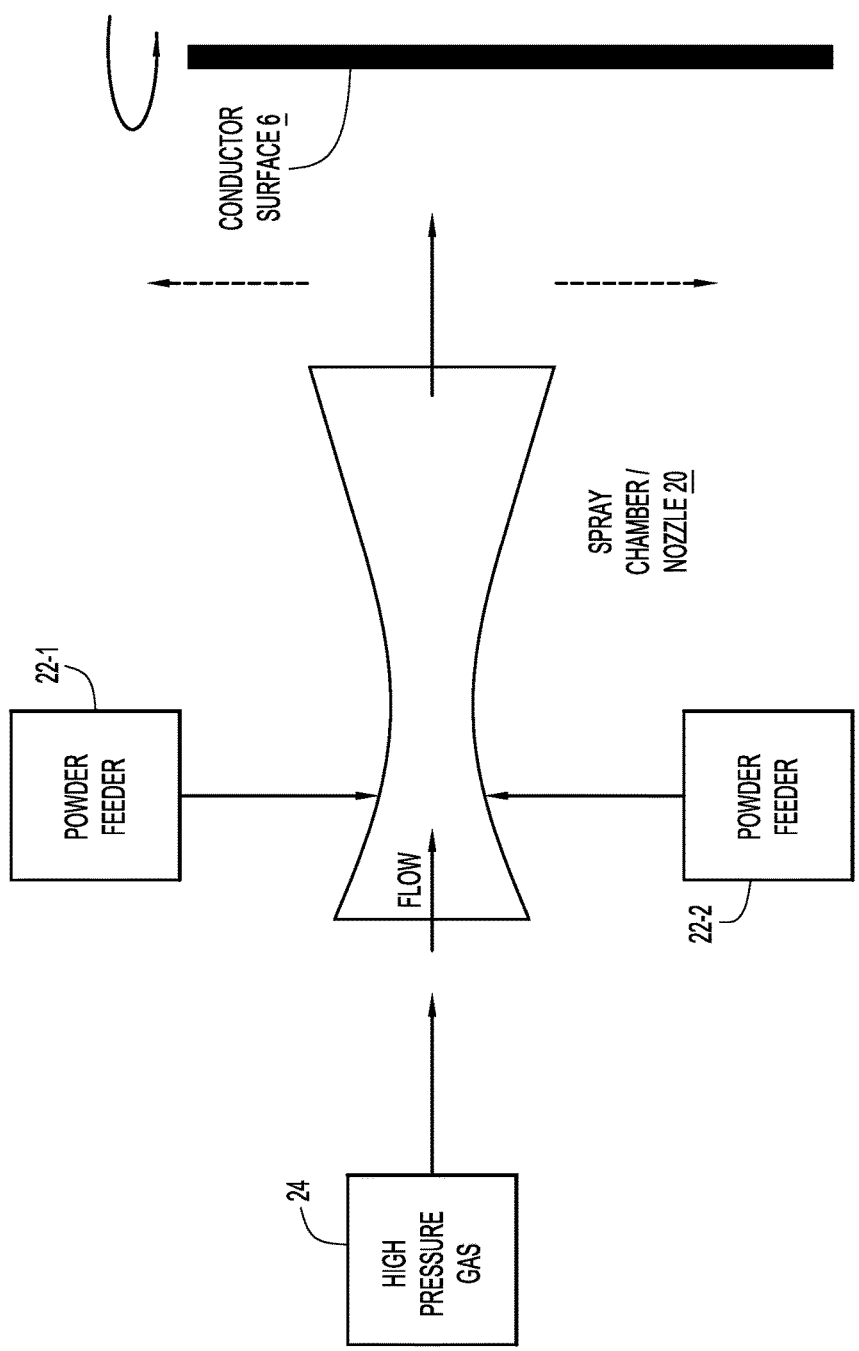
FIG. 3 schematically depicts an example process for depositing a rare earth coating on a conductor surface.

An example cold spray deposition process suitable for depositing a rare earth material coating onto a conductor is schematically depicted in FIG. 3. In particular, one or more powder feeders 22 (e.g., feeders 22-1 and 22-2 as shown in FIG. 3) provide one or more types of powders to a spray chamber/nozzle 20. As previously noted, multiple powder feeders 22 may be used, e.g., for configurations in which: 1. the REE and/or REO particles are not coated with additive, such that the REE/REO and additive powders are provided to the spray chamber/nozzle 20 in separate powder feeders 22 (e.g., feeders 22-1 and 22-2); and/or 2. two or more types of REE and/or REO particles (coated or uncoated with additive) are to be provided separately within the spray chamber/nozzle 20. A high pressure gas source 24 (e.g., a source of nitrogen or helium) also provides the high pressure gas to the spray chamber/nozzle 20. As shown in FIG. 3, spray chamber/nozzle 20 has a converging-to-diverging (CD) cross-sectional profile (in the direction of particle/gas flow) to accelerate the particulate/gas flow to supersonic velocity upon emerging from the nozzle outlet and toward a surface 6 of a conductor. It is further noted that the locations of components and orientations of injection of the gas and powders into the spray chamber/nozzle 20 are depicted for example purposes only in FIG. 3, and the cold spray deposition equipment is not limited to such orientations to achieve the deposition of the rare earth material upon the conductor surface 6. The dashed arrows in FIG. 3 further show possible directions at which the spray chamber/nozzle 20 can be moved to achieve a substantially uniform deposition of rare earth material onto the conductor surface. In addition, the conductor can be rotated during operation (e.g., as indicated by the rotational arrow in FIG. 3) to facilitate coating of surface portions of or the entire peripheral surface of the conductor. Further still, multiple spray nozzles can also be utilized to achieve a desired coating thickness over some or all of the outer peripheral surface of the conductor.

The coating compositions can be used for any suitable types of conductors, particularly for elongated (e.g., continuously extending) conductors having rounded or other non-planar surfaces upon which the coating composition is adhered. The conductors include a central portion or core that includes at least one conductive filament, where each conductive filament comprises a conductive metal material such as steel, copper and/or aluminum. In some embodiments, the conductor core includes a plurality of bundled conductive filaments arranged in one or more bands or layers in relation to a central axis of the core.

Example embodiments of conductors are overhead conductors typically used in power transmission lines, such as aluminum conductor steel supported (ACSS) cable of the round wire (RW) type or trap wire (TW) type. Other example embodiments of conductors include one or more conductive strands or wires twisted around one or more other conductive strands to form the core member, such as a cable conductor commercially available under the trademark VR2® from Southwire Corporation (Georgia). The conductors include a core member that can comprise one or more electrically conductive strands or wires that extend the length of the conductors, where the conductive wires can be arranged in any suitable configurations or arrays along a central axis of the conductors. For example, a conductor can include a core member that comprises one or more layers of wires, where the wires in each layer are arranged in any suitable manner (e.g., twisted with each other, wrapped together in the layer with each other, etc.). The core member can further include a single central strand or wire at the center of the core member with one or more layers of wires extending around the central wire. The conductive wires can have any suitable dimensions, including wires having cross-sectional dimensions (i.e., a dimensions transverse the length of the wires, such as diameters for wires having circular cross-sections) that are from about 1 mm or smaller to about 5 cm or greater. The outer transverse cross-section (e.g., outer diameter) of a conductor can also vary considerably based upon a particular application, where some conductors can have diameters of about 5 cm or smaller to about 30 cm or greater.

An example embodiment of an ACSS RW cable is depicted in FIG. 1, while an example embodiment of an ACSS TW cable is depicted in FIG. 2. In each embodiment, the ACSS cable has a rounded or circular cross-section and includes concentrically aligned or layered filaments or wires with a central or core portion 2 of the cable including steel strands or wires and one, two or more layers of aluminum strands or wires 4 circumferentially aligned around the core portion of steel wires. In an example embodiment, the aluminum wires can have a 1350-0 (fully annealed to soft) temper. The aluminum wires 4-1 have a circular or round configuration as shown for the ACSS RW cable type depicted in FIG. 1, while at least some of the aluminum wires 4-2 have a generally trapezoidal (or other multi-faceted) shape for the ACSS TW cable type depicted in FIG. 2. The steel and aluminum wires within the cables can be coated with an alloy or any other suitable coating to prevent corrosion and provide other protection for the wires as well as enhance power transmission capabilities within the cables. Examples of specific types of ACSS RW and ACSS TW cables are commercially available from, e.g., Southwire Company (Georgia). The ACSS cables are designed for use in overhead power transmission lines, where such cables are configured to operate continuously at elevated temperatures of up to about 250° C. without loss of strength. It is further noted that these cable types are provided for purposes of illustration only, and the rare earth material coating compositions described herein are not limited to implementation with only these cable types but instead can also be used to coat any other types of overhead conductors (e.g., bare or covered overhead conductors) as well as other types of conductors (e.g., conductors having multi-faceted or non-round cross sections or other geometrical shapes). For example, the rare earth material coating compositions described herein can be utilized to coat conductors that include core members comprising non-metallic materials (e.g., polymer composite materials).

Rare earth material coating compositions as described herein can be applied to the exterior surface, or portions thereof, of conductors (e.g., to a rounded or circular exterior surface) in the same manner as described herein in relation to cold spray deposition or using any other suitable deposition technique. For example, rare earth material can be applied to a portion of or the entire circumference of the exterior surface 6-1 or 6-2 of the cable types depicted in FIGS. 1 and 2 so as to form a coating layer 8 over the surface 6-1 or the surface 6-2 of a suitable thickness (e.g., a thickness from about 30 mil to about 35 mil).

The conductors coated with the rare earth material coating provides a number of benefits for the conductors including, without limitation, hydrophobic and anti-icing properties for the conductors as well as corrosion resistance for the conductors. The coatings prevent or significantly inhibit the formation or long term adhering of ice to the conductors in cold climates and over a wide range of water freezing temperatures in outdoor environments, thus enhancing or improving the structural integrity of the conductors particularly when supported above ground in long runs (e.g., overhead power lines).

Although the disclosed inventions are illustrated and described herein as embodied in one or more specific examples, it is nevertheless not intended to be limited to the details shown, since various modifications may be made therein without departing from the scope of the inventions. Accordingly, it is appropriate that the invention be construed broadly and in a manner consistent with the scope of the disclosure and the claims.

What is claimed:

1. A conductor comprising:
 a core comprising a plurality of conductive filaments bundled along a central axis of the core; and
 a coating deposited on a surface of the core, the coating comprising a rare earth material that includes at least one rare earth element selected from the group consisting of Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), Scandium (Sc) and Yttrium (Yt);
 wherein the rare earth material further comprises an additive that facilitates cohesion of the rare earth material coated on the surface of the core, and the rare earth material coating has a thickness of at least 20 mil.

2. The conductor of claim 1, wherein the rare earth material includes at least one rare earth element selected from the group consisting of La, Ce, Gd, Er and Tm.

3. The conductor of claim 1, wherein the rare earth material comprises at least one rare earth element in elemental form.

4. The conductor of claim 1, wherein the rare earth material comprises at least one rare earth oxide.

5. The conductor of claim 4, wherein the at least one rare earth oxide comprises at least one of $La_2O_3$, $CeO_2$, $Gd_2O_3$, $Er_2O_3$ and $Tm_2O_3$.

6. The conductor of claim 1, wherein the additive is less than 50% by volume of the rare earth material.

7. The conductor of claim 6, wherein the additive comprises aluminum or zinc.

8. The conductor of claim 1, wherein the rare earth material coating has a thickness of at least 30 mil.

9. The conductor of claim 1, wherein the conductor comprises an overhead conductor.

10. The conductor of claim 9, wherein the conductor comprises an aluminum conductor steel supported (ACSS) cable.

11. A conductor comprising:
 a core comprising a plurality of conductive filaments bundled along a central axis of the core; and
 a coating deposited on a surface of the core, the coating comprising a rare earth material that includes at least one rare earth element selected from the group consisting of Lanthanum (La), Neodymium (Nd), Promethium (Pm), Samarium (Sm), Europium (Eu), Gadolinium (Gd), Dysprosium (Dy), Holmium (Ho), Erbium (Er), Thulium (Tm), Ytterbium (Yb), Lutetium (Lu), Scandium (Sc) and Yttrium (Yt).

12. A conductor comprising:
 a core comprising a plurality of conductive filaments bundled along a central axis of the core; and
 a coating deposited on a surface of the core, the coating comprising a rare earth material that includes at least one rare earth element selected from the group consisting of Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), Scandium (Sc) and Yttrium (Yt);
 wherein the rare earth material further comprises an additive that facilitates cohesion of the rare earth material coated on the surface of the core, and the additive comprises aluminum or zinc.

* * * * *